Feb. 23, 1937.     O. W. HAWN     2,071,627
PICK-UP REEL FOR HARVESTERS
Filed Jan. 31, 1936

INVENTOR
O. W. Hawn
BY
ATTORNEY

Patented Feb. 23, 1937

2,071,627

UNITED STATES PATENT OFFICE 2,071,627

PICK-UP REEL FOR HARVESTER

Oren W. Hawn, Woodland, Calif.

Application January 31, 1936, Serial No. 61,691

2 Claims. (Cl. 56—221)

This invention relates generally to harvesters and the invention is directed particularly to a pick-up reel for harvesters.

In harvesting grain and the like, the stocks of which have become tangled or have been knocked down by wind or rain, a large proportion of the grain is "skipped" by the sickle and is not cut, resulting of course in a loss to the farmer.

It is therefore the principal object of my invention to provide a pick-up reel for harvesters, to take the place of the ordinary reel, which will pick up tangled and so-called "down" grain and present the same in a position for proper cutting by the sickle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
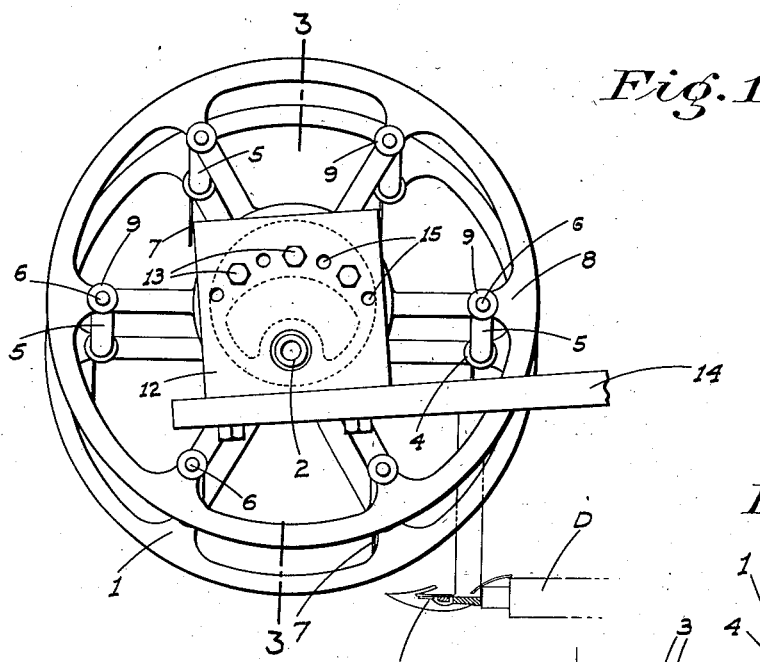
Figure 1 is an end view of my improved reel as mounted on a harvester.

Referring now more particularly to the characters of reference on the drawing, the reel comprises two circular spiders 1 secured in spaced relation on a drive shaft 2 which is supported at each end and driven in the customary manner.

A plurality of rods 3 extend between the arms of the two spiders and are journaled in the outer ends of said arms in bosses 4. At one end the rods extend beyond the adjacent spider and are formed with cranks 5; each crank having a crank pin 6 projecting away from the spiders.

Spring finger units 7 having dual fingers are fixedly secured to the rods in evenly spaced relation and preferably so that the fingers are parallel to the cranks. The units on the different rods are arranged in staggered relation to each other so that the depending fingers of all the units are evenly distributed throughout the length of the reel.

A control spider 8 having its arms arranged parallel to those of the reel spiders, is disposed outwardly of the cranks 5, the crank pins 6 being journaled in bosses 9 formed in the arms of the spider 8, in such a position that all the cranks are parallel to each other.

The spider 8 is formed with an axial hub 10 which is turnable on a central eccentric 11. The shaft 2 turnably projects through this eccentric in off-set relation to the center thereof an amount equal to the distance between the rods 3 and the crank pins 6; and the spider 8 is thus eccentric to the spiders 1 a corresponding amount.

The eccentric 11 is secured to a supporting plate 12 by means of bolts 13 in order to rigidly hold the eccentric against undesired rotation. The plate 12 is rigidly secured on the adjacent reel supporting beam 14 of the harvester. The plate 12 is provided with a series of bolt holes 15 struck on an arc centered on the axis of the shaft 2, in order that the position of the eccentric reel to said shaft may be adjusted.

In operation the reel is rotated in the proper direction by means of the drive shaft 2 and is of course disposed in clearance relation to the ground and also to the cutter bar and sickle unit S which is mounted adjacent the reel in the customary position and manner.

Figure 2:
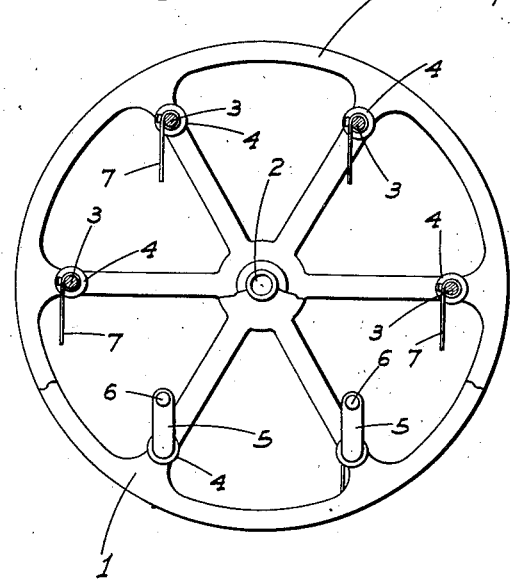
Figure 2 is an end view of the reel detached and partly broken away.
Figure 3:
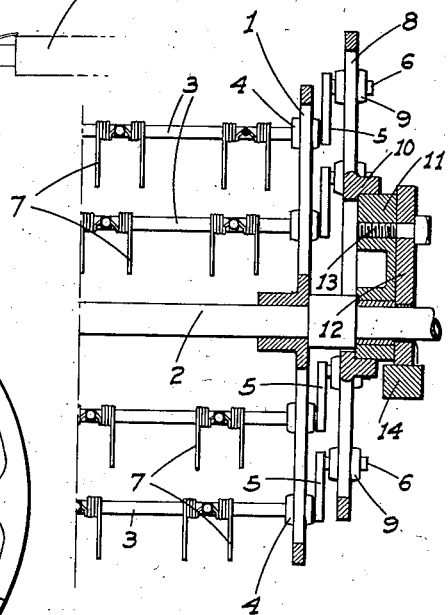
Figure 3 is a fragmentary vertical transverse section taken on the line 3—3 of Fig. 1.

As the reel rotates together with the control spider 8, the finger units 7, due to the crank connection between the rods 3 on which the finger units are fixed and the control spider, do not alter their position relative to a vertical plane but remain in a predetermined depending position at all times as clearly shown in Fig. 2. Thus as each rod approaches the ground with the downward rotation of the forward side of the reel, the depending fingers pick up tangled and "down" grain and raise it to a position for cutting by the sickle unit S. After cutting, the grain is of course deposited on the adjacent draper, a portion of which is indicated at D; the rods 3 then functioning in the same manner as the cross-bars or slats of the ordinary reel, to cause the grain as cut to be properly deflected onto the draper.

If it is desired to change the depending position of the fingers forwardly or rearwardly, as operating conditions may warrant, this may be accomplished by first removing the bolts 13, turning the eccentric 11 on the shaft 2 so as to relocate the same in an advanced or retarded position relative to the direction of rotation of the reel, and resetting the bolts. The holes 15 are provided in the plate 12 for this purpose, being as previously stated, disposed in an arc concentric with the shaft 2.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A pick-up reel for harvesters, comprising spaced frame members, a shaft journaled at each end on one of said members and adapted to be driven, spaced spiders mounted on said shaft, circumferentially spaced rods turnably mounted in and extending between the spiders, pick-up fingers secured on and depending from the rods, a circular eccentric mounted on the shaft in offset relation thereto for rotatable adjustment thereabout, a control spider axially turnable on the eccentric and disposed adjacent one end of the reel, cranks on the ends of the rods between the control spider and the adjacent reel spider, a supporting plate mounted on the frame member adjacent the eccentric, said plate being formed with a series of bolt holes struck on an arc centered on the axis of the shaft, and said eccentric having a hole therein to selectively match with any one hole of said series, and a bolt extending through matching holes.

2. A device as in claim 1 in which the supporting plate is formed with a journal, the adjacent end of the shaft being supported therein.

OREN W. HAWN.